(12) United States Patent
Granacher et al.

(10) Patent No.: US 10,706,032 B2
(45) Date of Patent: Jul. 7, 2020

(54) UNSOLICITED BULK EMAIL DETECTION USING URL TREE HASHES

(71) Applicant: International Business Machines Corporation, Armonk, NY (US)

(72) Inventors: Astrid Granacher, Kassel (DE); Dirk Harz, Kassel (DE); Juergen Kader, Kassel (DE); Johannes Noll, Ronshausen (DE); Mark Usher, Göttingen (DE)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 14/729,112

(22) Filed: Jun. 3, 2015

(65) Prior Publication Data

US 2016/0321255 A1     Nov. 3, 2016

Related U.S. Application Data

(63) Continuation of application No. 14/698,194, filed on Apr. 28, 2015.

(51) Int. Cl.
    *G06F 7/00*     (2006.01)
    *G06F 16/22*     (2019.01)
    (Continued)

(52) U.S. Cl.
    CPC ...... *G06F 16/2246* (2019.01); *G06F 16/2386* (2019.01); *H04L 51/12* (2013.01); *H04L 51/22* (2013.01)

(58) Field of Classification Search
    CPC .................................................. G06F 16/285
    (Continued)

(56) References Cited

U.S. PATENT DOCUMENTS 6,556,984 B1 * 4/2003 Zien .................... G06F 16/955
6,772,196 B1 * 8/2004 Kirsch ................ G06Q 10/107
                                                            707/999.005

(Continued)

FOREIGN PATENT DOCUMENTS

JP     4445243 B2     4/2010
WO     2013009713 A2     1/2013

OTHER PUBLICATIONS

IBM, "List of IBM Patents or Patent Applications Treated as Related (Appendix P)," Jun. 3, 2015, p. 1-2.

(Continued)

*Primary Examiner* — Eliyah S. Harper
(74) *Attorney, Agent, or Firm* — Robert C. Bunker

(57) ABSTRACT

According to one exemplary embodiment, a method for detecting unsolicited bulk emails (UBE) is provided. The method may include receiving an email. The method may also include identifying a uniform resource locator (URL) contained in the received email. The method may then include dividing the identified URL into a plurality of component parts. The method may further include generating a tree structure based on the plurality of component parts. The method may also include generating an input string based on the generated tree structure. The method may then include calculating a hash value based on the generated input string. The method may further include determining if the calculated hash value matches a UBE hash value within a plurality of UBE hash values. The method may also include identifying the received email as a UBE based on determining that the calculated hash value matches the UBE hash value.

6 Claims, 8 Drawing Sheets

(51) Int. Cl.
*H04L 12/58* (2006.01)
*G06F 16/23* (2019.01)

(58) Field of Classification Search
USPC .......................................................... 707/785
See application file for complete search history.

(56) References Cited

U.S. PATENT DOCUMENTS

| | | | |
|---|---|---|---|
| 7,406,502 B1 * | 7/2008 | Oliver | G06F 16/24558 |
| | | | 709/206 |
| 7,539,726 B1 * | 5/2009 | Wilson | H04L 51/12 |
| | | | 709/206 |
| 7,908,330 B2 * | 3/2011 | Oliver | H04L 51/12 |
| | | | 709/204 |
| 8,260,914 B1 | 9/2012 | Ranjan | |
| 8,495,144 B1 | 7/2013 | Cheng et al. | |
| 8,533,270 B2 | 9/2013 | Starbuck et al. | |
| 8,839,418 B2 | 9/2014 | Hulten et al. | |
| 8,924,484 B2 * | 12/2014 | Wilson | G06Q 10/107 |
| | | | 709/206 |
| 8,959,159 B2 * | 2/2015 | Vitaldevara | H04L 51/12 |
| | | | 709/206 |
| 2004/0093384 A1 * | 5/2004 | Shipp | G06Q 10/107 |
| | | | 709/206 |
| 2005/0021644 A1 * | 1/2005 | Hancock | G06Q 10/107 |
| | | | 709/206 |
| 2007/0006293 A1 * | 1/2007 | Balakrishnan | H04L 63/0245 |
| | | | 726/13 |
| 2007/0011252 A1 * | 1/2007 | Taylor | H04L 51/12 |
| | | | 709/206 |
| 2009/0063538 A1 * | 3/2009 | Chitrapura | G06F 17/30887 |
| 2009/0113003 A1 * | 4/2009 | Lu | G06K 9/00456 |
| | | | 709/206 |
| 2012/0130983 A1 * | 5/2012 | Ryan | G06F 16/90344 |
| | | | 707/715 |
| 2014/0280302 A1 * | 9/2014 | Morsi | G06F 16/24575 |
| | | | 707/769 |
| 2014/0331319 A1 | 11/2014 | Munro, IV et al. | |
| 2015/0295869 A1 * | 10/2015 | Li | H04L 51/12 |
| | | | 709/206 |
| 2016/0080173 A1 | 3/2016 | Quick | |
| 2016/0321254 A1 | 11/2016 | Granacher et al. | |

OTHER PUBLICATIONS

Granacher et al., "Unsolicited Bulk Email Detection Using URL Tree Hashes," Filed on Apr. 28, 2015, p. 1-39, U.S. Appl. No. 14/698,194.

Crawford et al., "Kwyjibo: Automatic Domain Name Generation," Software—Practice & Experience, 2008, p. 1561-1567, vol. 38, Issue 14, Abstract Only.

Mell et al., "The NIST Definition of Cloud Computing," National Institute of Standards and Technology, Sep. 2011, p. 1-3, Special Publication 800-145.

Zawoad et al., "CURLA: Cloud-Based Spam URL Analyzer for Very Large Datasets," IEEE International Conference on Cloud Computing, 2014, p. 729-736, IEEE Computer Society.

* cited by examiner

UNSOLICITED BULK EMAIL DETECTION USING URL TREE HASHES

BACKGROUND

The present invention relates generally to the field of computing, and more particularly to unsolicited bulk email detection.

Unsolicited bulk emails often create security risks, disruptions, and waste resources. In many instances, unsolicited bulk email senders may rapidly generate emails and circumvent unsolicited bulk email detection methods.

SUMMARY

According to one exemplary embodiment, a method for detecting unsolicited bulk emails (UBE) is provided. The method may include receiving an email. The method may also include identifying a uniform resource locator (URL) contained in the received email. The method may then include dividing the identified URL into a plurality of component parts. The method may further include generating a tree structure based on the plurality of component parts. The method may also include generating an input string based on the generated tree structure. The method may then include calculating a hash value based on the generated input string. The method may further include determining if the calculated hash value matches a UBE hash value within a plurality of UBE hash values. The method may also include identifying the received email as a UBE based on determining that the calculated hash value matches the UBE hash value.

According to another exemplary embodiment, a computer system for detecting unsolicited bulk emails (UBE) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an email. The method may also include identifying a uniform resource locator (URL) contained in the received email. The method may then include dividing the identified URL into a plurality of component parts. The method may further include generating a tree structure based on the plurality of component parts. The method may also include generating an input string based on the generated tree structure. The method may then include calculating a hash value based on the generated input string. The method may further include determining if the calculated hash value matches a UBE hash value within a plurality of UBE hash values. The method may also include identifying the received email as a UBE based on determining that the calculated hash value matches the UBE hash value.

According to yet another exemplary embodiment, a computer program product for detecting unsolicited bulk emails (UBE) is provided. The computer program product may include one or more computer-readable storage devices and program instructions stored on at least one of the one or more tangible storage devices, the program instructions executable by a processor. The computer program product may include program instructions to receive an email. The computer program product may also include program instructions to identify a uniform resource locator (URL) contained in the received email. The computer program product may then include program instructions to divide the identified URL into a plurality of component parts. The computer program product may further include program instructions to generate a tree structure based on the plurality of component parts. The computer program product may also include program instructions to generate an input string based on the generated tree structure. The computer program product may then include program instructions to calculate a hash value based on the generated input string. The computer program product may further include program instructions to determine if the calculated hash value matches a UBE hash value within a plurality of UBE hash values. The computer program product may also include program instructions to identify the received email as a UBE based on determining that the calculated hash value matches the UBE hash value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
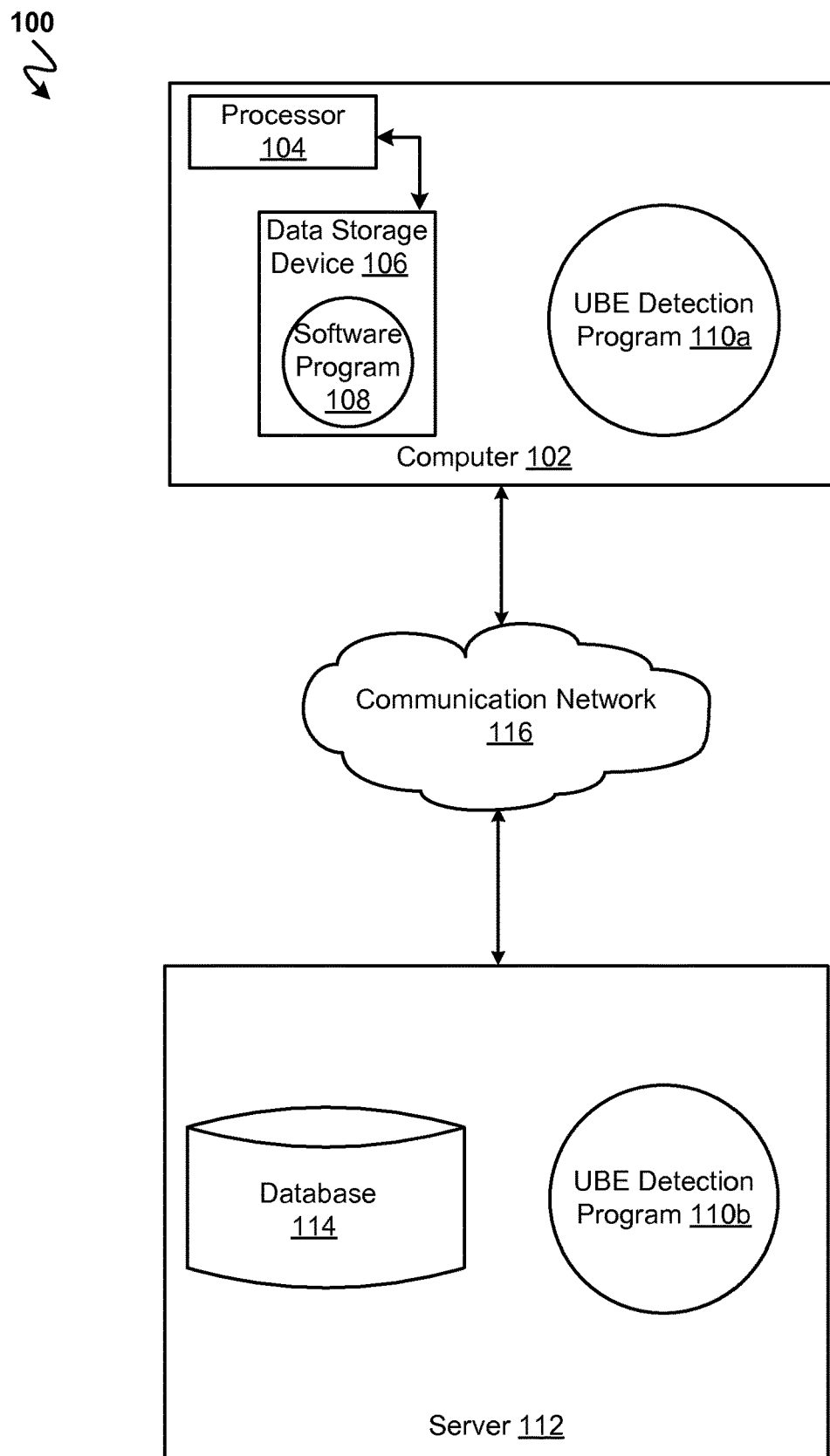
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for unsolicited bulk email (UBE) detection using uniform resource locator (URL) tree hashes. As such, the present embodiment has the capacity to improve the technical field of unsolicited bulk email detection by analyzing the structure of the URLs present in an email. More specifically, the URLs found in an email may be used to populate a tree structure. Based on a depth-first tree traversal of the URL-tree, a tree signature may be produced that may be hashed using a standard hashing procedure and stored in a database. Subsequent received emails may then have a tree signature calculated and compared with the previously stored tree signatures to determine if the email is an unsolicited bulk email or not.

As described previously, UBEs are a consistent issue for email users by being disruptive, wasting resources, and presenting security risks. In UBEs, a uniform resource locator (URL) is often used as the attack vector to entice the UBE recipient out of an email client and onto a web site hosted by the party that sent the UBE (e.g., phishing email).

A common method for URL-based UBE detection is to maintain a large database of known UBE URLs (i.e., a "blacklist"). The URLs are gathered from current UBE samples obtained from UBE traps or reported UBEs. The URLs are usually normalized in some way, then hashed (e.g., with a MD5 hash algorithm) to create a database lookup key. If a URL hash contained in an unknown UBE matches against the database of known UBE URLs, then the email is considered a UBE and rejected. URLs contained in UBEs are usually filtered against lists of known hosts to ensure that good URLs (e.g., www.ibm.com) do not end up in the UBE URL database, even though the URL appeared in the UBEs.

However, database methods of UBE URL detection may be circumvented by using random domains and random hosts. A UBE sender may register a large number of random domains and then deliver new UBEs using the new domains. The new UBEs may be generated and sent out within seconds of successfully registering a new domain. In such situations, blacklist-based URL filters have little time to react to the new domains and may not correctly identify the emails as UBEs.

In order to make use of the new domains, a UBE sender must be able to set up a web site on the domain very quickly. Typically, a previously generated template set of web pages may be uploaded to the new domain. Even though the content of the UBE message may vary, the layout of the web pages on the webserver would remain the same and this layout may be reflected in the structure of the URLs present in the UBE.

Therefore, it may be advantageous to, among other things, provide a reliable way to detect UBEs by analyzing the URL structure of URLs contained within a UBE.

According to at least one embodiment, the structure of the URLs in an email may be analyzed to determine a signature (i.e., "fingerprint") of the layout of the web site. The signature may remain the same, regardless of the domain the content is hosted on and thus template web pages may be detected regardless of the domain, host, or path names.

The URLs present in the email may be visualized together as a tree structure, with the host as the root of the tree, the URL path components as the tree branches, and the filename (e.g., HTML document) as a leaf. By combining the URLs in the email into a single tree structure, a depth-first search tree traversal may produce a signature of the tree. The signature may contain properties of each node in the tree such as node position, depth, and generic attributes (e.g., path, leaf, host, query, fragment, jpeg image, php file, etc.). Therefore, the signature may be resilient against changes to domain, host, and pathnames.

The signature may then be hashed using a standard hashing procedure (e.g., MD5 hashing algorithm) to produce a hash value that may be stored in a data repository, such as a database. A hash database of URL tree signatures may be built up using signatures of known UBEs.

When analyzing an unknown email, the signature of the URLs in the unknown email may be calculated and a hash value generated. The generated hash value corresponding to the unknown email's signature may be compared with the hash values stored in the UBE hash database. If the unknown email's hash value matches a hash value found in the UBE hash database, the unknown email may be identified as a UBE.

The present embodiment may be easily integrated into existing UBE detection workflows and may handle instances involving unknown domains when the pattern of URLs (and hence the layout of the UBE web pages) is already known.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an unsolicited bulk email (UBE) detection program 110a. The networked computer environment 100 may also include a server 112 that is enabled to run a UBE detection program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the UBE detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the UBE detection program 110a, 110b (respectively) to use the URL structures within emails to identify UBEs. The method of using URL-tree hashes to detect UBE is explained in more detail below with respect to FIGS. 2A, 2B, 3A, and 3B.

Figure 2A:
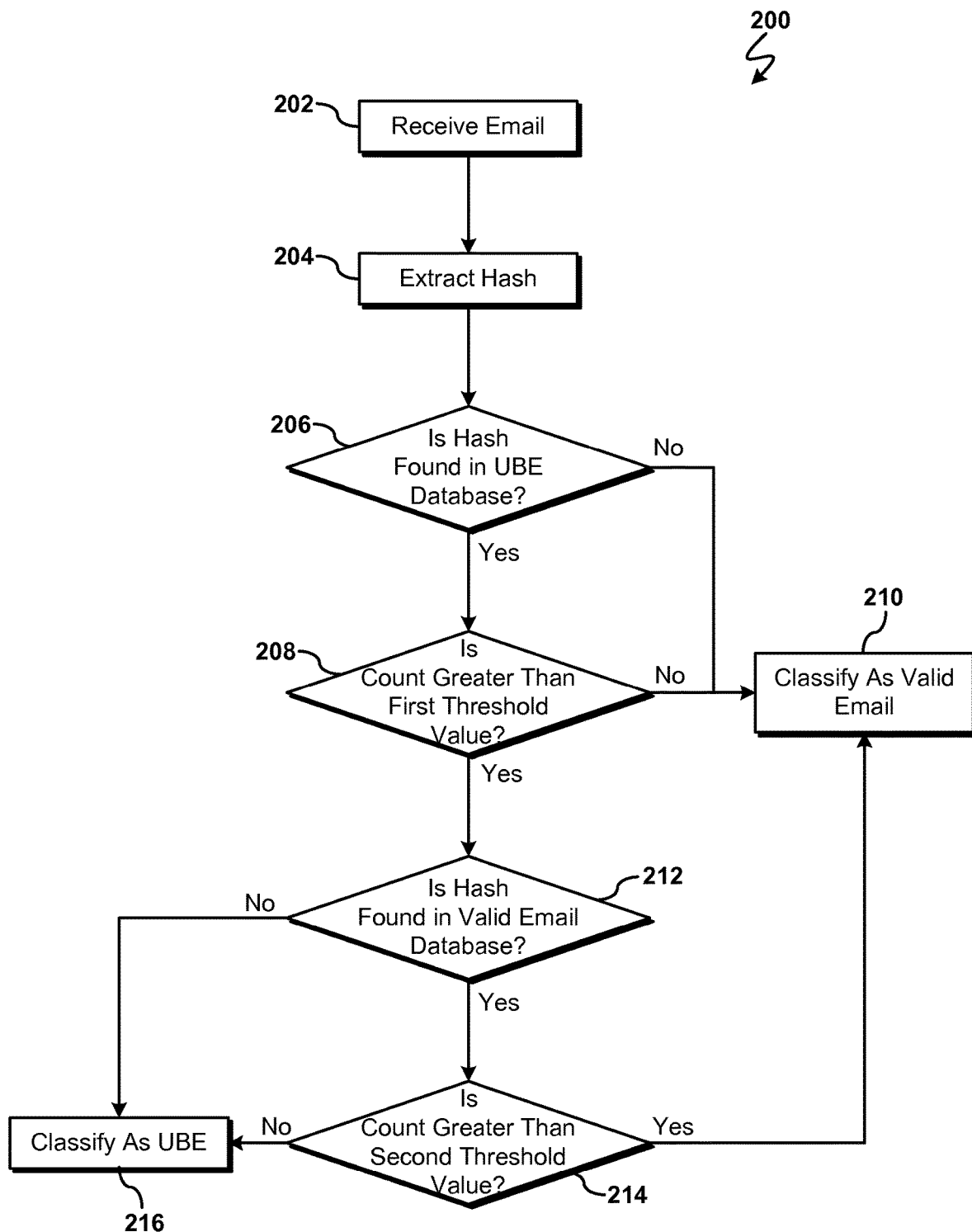
FIG. 2A is an operational flow chart illustrating a process for detecting unsolicited bulk emails (UBEs) using uniform resource locator (URL) tree hashes according to at least one embodiment.

Referring now to FIG. 2A, an operational flow chart illustrating the exemplary steps 200 used by the unsolicited bulk email (UBE) detection program 110a and 110b (FIG. 1) according to at least one embodiment is depicted.

At 202, an email may be received for analysis and classification as a UBE or as a valid email. According to at least one embodiment, the email received may not have had any prior processing done to determine if the email is a UBE.

Next, at 204, the email's contents may be analyzed to extract a hash value describing the URL content within the received email. According to at least one embodiment, the structure of the URLs within an email may be analyzed to determine a signature of the web site the URLs contained within the email correspond with. Using known methods, the received email may be scanned for URLs and a list of URLs found in the email may be created.

Once the list of URLs has been created, a URL tree may be generated as will be discussed in detail below with respect to FIG. 2B.

After the URL tree has been created, each node may be assigned a depth value (e.g., the host node has a depth value of 1, the first path node has a depth value of 2, and so on), a position value relative to the node's parent node (e.g., the first child node of a parent node has a position value of 1, the second child node of the parent node has a position value of 2 and so on), in addition to the count value representing the number of times a component part was present in different URLs found in the received email.

After assigning properties to each node (e.g., depth, position, count, and generic attribute), an input string may be generated to represent the URL signature of the email. The input string may be generated by using a known algorithm, such as a depth-first search (DFS) tree traversal order. For example, the first node read from the tree structure using a DFS order may be used as the initial input string, whereby the node may be represented as a text string that lists the node's properties (e.g., "HOST, D1, C1, P0"). A text string listing the next node's properties found using the DFS order may then be appended to the end of the input string as the second iteration of the input string. Subsequent iterations may continue to append node properties to the input string until the DFS order has traversed each node in the tree. Upon completion, the input string may have an ordered list of all nodes in the tree whereby each node in the tree may be represented by the node's properties.

According to at least one embodiment, the completed input string may then be used in conjunction with a known hashing function (e.g., MD5 hashing function) to calculate a compact hash value (e.g., 16 bytes).

Then, at 206, it may be determined if the extracted hash (i.e., compact hash value calculated at 204) is found in a data structure containing UBE hash values, such as a UBE database (e.g., database 114 (FIG. 1)). According to at least one embodiment, the UBE database may be created prior to receiving any emails to analyze. The UBE database may be built, in part, from hash values corresponding with known UBEs. Known UBEs may be found through use of traps (i.e., honeypots), published UBE corpora, or from UBEs reported by users. The known UBEs that may be collected may be subjected to the same process as described previously to generate a hash value corresponding with each UBE's URL signature. The generated hash values for the UBEs may then be used to populate the UBE database for later searching. Additionally, the UBE database may also store the number of times a hash value has been found in UBE emails (i.e., a count value). Using the UBE database, the received email's calculated hash from 204 may be used to search the UBE database for a matching entry.

If it was determined that the received email's hash value is found in the UBE database at 206, the count associated with the matching hash value found in the UBE database may be checked against a predefined first threshold value at 208 to determine if the count associated with the hash value found in the UBE database exceeds the predefined first threshold value. According to at least one embodiment, the reliability of detection may be increased by taking into account the number of times the hash value has been found in UBEs (e.g., only blocking an email if the hash has been found more than times). The predefined first threshold value may be a number set by a user, an algorithm, or by some other way.

However, if it was determined that the hash value associated with the received email was not found in the UBE database at 206, or if the count associated with the hash value found in the UBE database does not exceed the predefined first threshold value at 208, the received email may be classified as a valid email at 210.

If the count associated with the hash value found in the UBE database does exceed the predefined first threshold value at 208, it may then be determined if the received email's hash value is found in a database containing hash values corresponding to valid emails at 212. The database of valid emails may be generated in the previously described way that the UBE database is generated. Then the received email's calculated hash from 204 may be used to search the valid email database for a matching entry.

Based on determining that the received email's hash is found in the valid email database at 212, it may be determined if the count associated with the matching hash value found in the valid email database exceeds the predefined second threshold value at 214. According to at least one embodiment, the reliability of detection may be increased by taking into account the number of times the hash value has been found in valid emails by comparing the count associated with the UBE database hash value to the count associated with the valid email database hash value (e.g., classifying an email as a UBE if the hash value has been found one thousand times in UBEs while only being found once in a valid email). The predefined second threshold value may be a number set by a user, an algorithm, or by some other way. When used to compare the count associated with the UBE database hash value to the count associated with the valid email database hash value, the second predefined threshold value may be a ratio value (e.g., 10:1).

If it was determined that the hash value associated with the received email was not found in the valid email database at 212, or if the count associated with the hash value found in the valid database does not exceed the predetermined second threshold value at 214, the received email may be classified as a UBE email at 216.

However, if it was determined at 214 that the count associated with the hash value found in the valid database does exceed the predefined second threshold value, the received email may be classified as a valid email at 210.

Figure 2B:
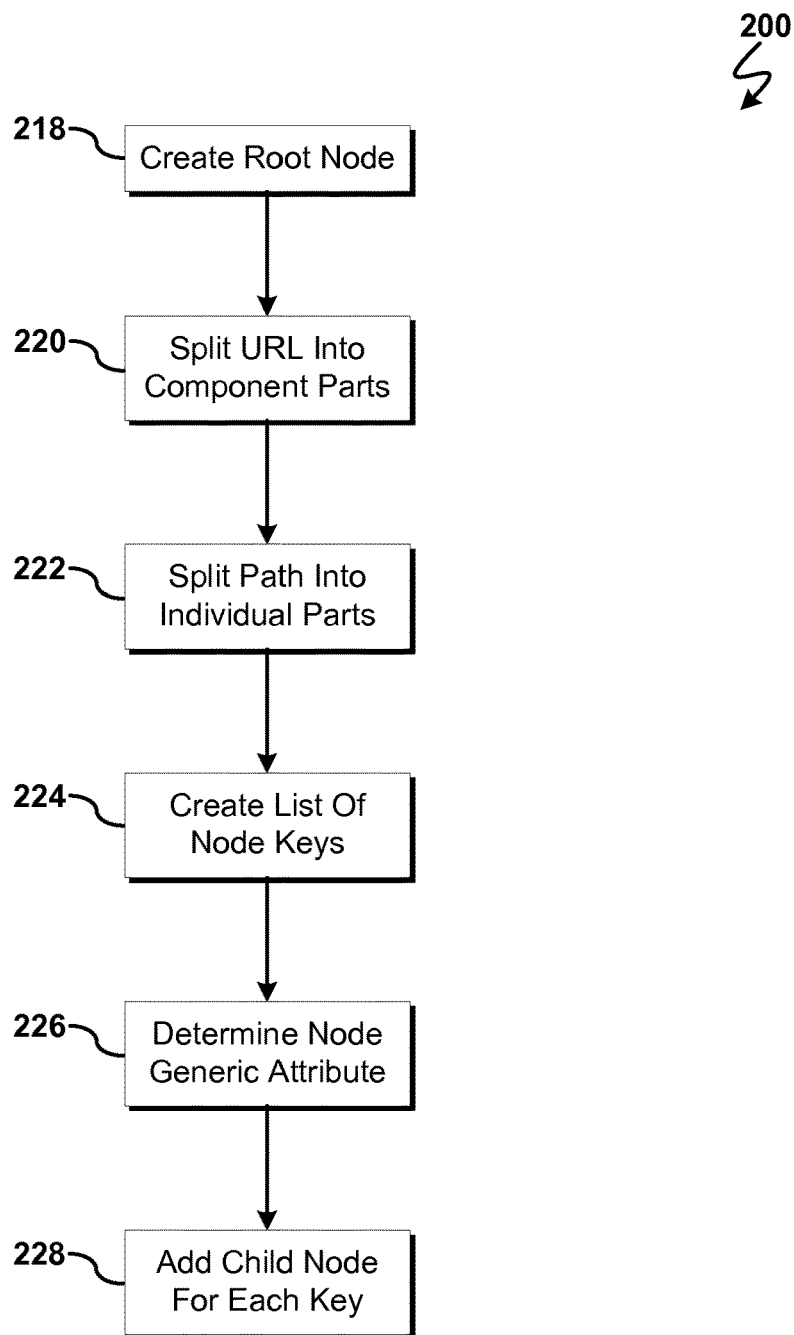
FIG. 2B is an operational flow chart illustrating a process for building URL trees according to at least one embodiment.

Referring now to FIG. 2B, an operational flow chart illustrating the exemplary steps 200 used by the unsolicited bulk email (UBE) detection program 110a and 110b (FIG. 1) to generate a URL tree according to at least one embodiment is depicted.

The component parts of the URLs present in the email may then be used to generate a data structure that preserves the relationship of the URL components, such as a tree structure.

At 218, the URL tree may be generated by creating a generic root node. The root node and tree structure may be implemented, for example, as a data structure such as a linked list.

Next, at 220, each URL in the previously generated list of URLs may be split into individual component parts. According to at least one embodiment, each URL in the list of URLs may be divided into a host part, a path part, a query part, and a fragment part.

For example, if an email has as a URL http://www.host.com/alpha/bravo/golf.php?query, the URL may be initially broken up into three component parts including a host part (i.e., "www.host.com"), a path part (i.e., "alpha/bravo/golf.php") and a query part (i.e., "query"). The host part, path part, query part, and fragment part may be identified using known string parsing methods and URL conventions (e.g., the host part may be identified as the string of characters between the characters "http://" and the next forward slash character).

Then, at 222, the path part may be further split into component parts. According to at least one embodiment, the path part may be split into component parts using known string parsing methods and URL conventions (e.g., path component parts may be separated by a forward slash character).

For example, if an email has as a URL http://www.host.com/alpha/bravo/golf.php?query, the path part "alpha/bravo/golf.php" identified previously at 220 may be further split into three component parts (i.e., "alpha", "bravo", and "golf.php"). After steps 220 and 222, the URL will result in five component parts (i.e., "www.host.com", "alpha", "bravo", "golf.php", and "query").

At 224 a list of node keys based on the URL component parts may be created. According to at least one embodiment, each URL component part may be used as a key value and stored in a list. For example, if an email has as a URL http://www.host.com/alpha/bravo/golf.php?query with path part "alpha/bravo/golf.php", the resulting list of node keys would include "www.host.com", "alpha", "bravo", "golf.php", and "query".

Next, at 226, generic attributes may be determined for each tree node corresponding to each key value. According to at least one embodiment, attributes may be determined for each key value that may be used to generate nodes to add to the URL tree. For example, possible generic attributes may include the node attributes listed in the following attribute table:

| Attribute | Remarks |
| --- | --- |
| HOST | The node is a host node |
| PATH | The node is a component of a path |
| QUERY | The node is a query string |
| FRAGMENT | The node is a fragment string |
| IMAGE | The node is an image file, e.g. jpg, gif, bmp, png . . . |
| PHP | The node is a php file (.php) |
| HTML | The node is an html file (.htm, .html) |
| JS | The node is a JavaScript file (.js) |
| ASP | The node an Active Server Pages file (.asp) |
| CSS | The node is a cascading style sheet file (.css) |
| EMAIL | The node contains an email address |

Then, at 228, for each key in the list of keys, a child node may be added to the tree. According to at least one embodiment, a procedure (e.g., AddOrIncrementChild(node, key, attributes, successors)) may be used to add child nodes onto an input node to create the URL tree. The procedure AddOrIncrementChild may take as input a tree node and may attempt to insert the child node with a given key (e.g., host, path part, query data, or fragment data). If a child node with the same key value exists on the input node (i.e., a child node of the input node already exists with the same key value) a count associated with the child node may be incremented by one and the node properties may be merged. However, if the child node does not already exist with the given key on the input node, a new node may be created and inserted into the list of children on the input node. The AddOrIncrementChild procedure may then return the child node that may be used as the new input node when inserting the next child node.

Figure 3A:
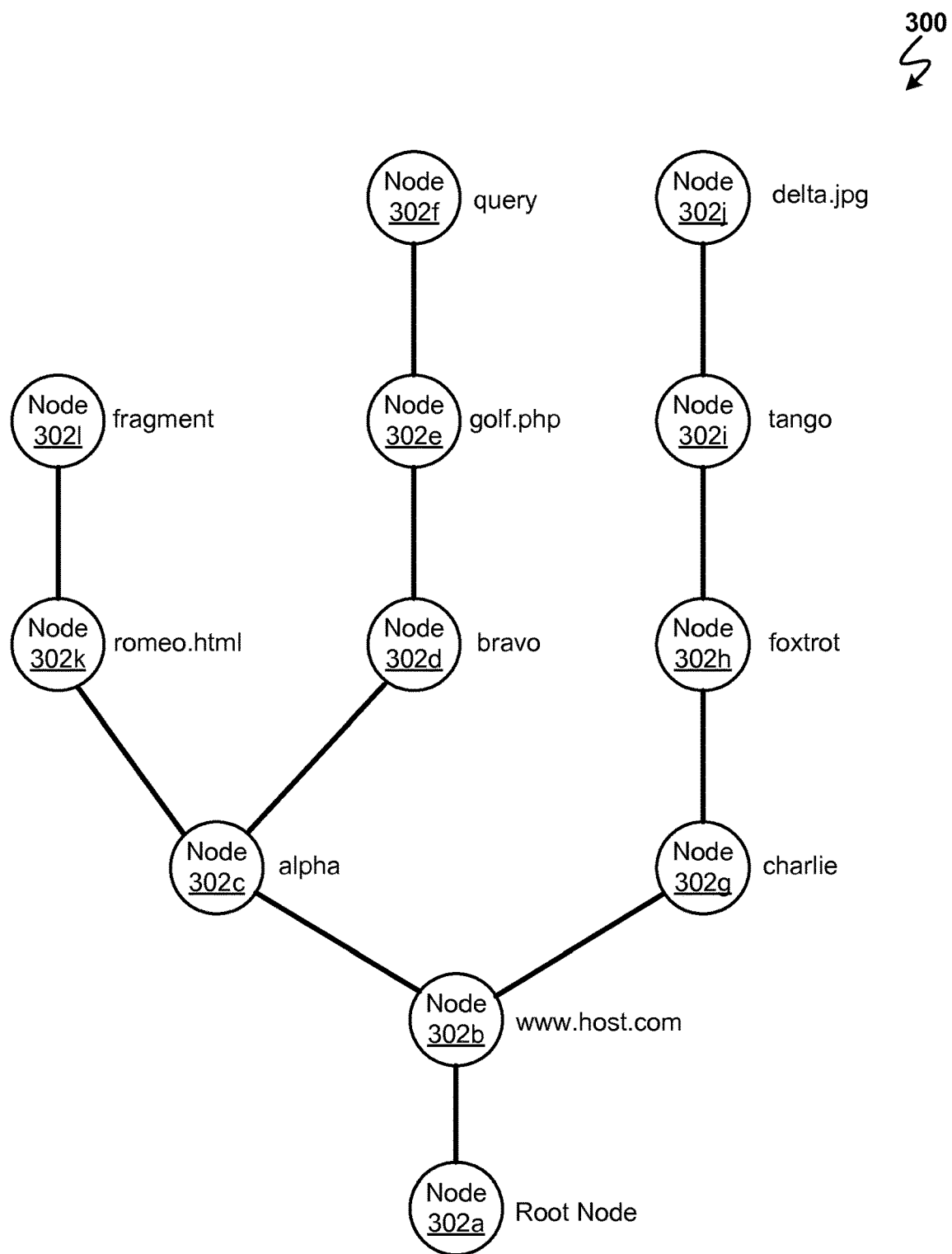
FIG. 3A illustrates an example URL tree structure according to at least one embodiment.

Referring now to FIG. 3A, an illustration of an example URL tree structure generated based on URLs present in a received email according to at least one embodiment is depicted.

In an example scenario, the UBE detection program 110a and 110b (FIG. 1) may receive an email as described previously in step 202 (FIG. 2A). The UBE detection program 110a and 110b (FIG. 1) may then proceed to extract the hash value corresponding with the structure of the URLs contained in the email as described previously in step 204 (FIG. 2A). The structure of the URLs contained in the received email may analyzed by scanning the email for URLs, parsing found URLs, mapping the parsed URLs to a tree structure, generating an input string signature, and hashing the generated input string.

After the email is received, the email is scanned to identify URLs contained within the email. For example, the following URLs may be found after scanning the received email:

http://www.host.com/alpha/bravo/golf.php?query
http://www.host.com/charlie/foxtrot/tango/delta.jpg
http://www.host.com/alpha/romeo.html#fragment Once the URLs have been identified, a list of URLs may be generated. Then the component parts of each URL may be determined by parsing the URL as described previously in steps 220 (FIG. 2B) and 222 (FIG. 2B). The first URL, (i.e., "http://www.host.com/alpha/bravo/golf.php?query") is parsed, resulting in five component parts (i.e., "www.host.com", "alpha", "bravo", "golf.php", and "query") that are identified after completing previously described step 222 (FIG. 2B). Next, the second URL, (i.e., "http://www.host.com/charlie/foxtrot/tango/delta.jpg") is parsed, resulting in five component parts (i.e., "www.host.com", "charlie", "foxtrot", "tango", and "delta.jpg") that are identified after completing previously described step 222 (FIG. 2B). Finally, the third URL, (i.e., "http://www.host.com/alpha/romeo.html#fragment") is parsed, resulting in four component parts (i.e., "www.host.com", "alpha", "romeo.html", and "fragment") that are identified after completing previously described step 222 (FIG. 2B).

Based on the identified component parts for each URL, a URL tree 300 may be generated as depicted in FIG. 3A. The component parts corresponding with the first URL are initially added to the URL tree 300 as described previously in step 228 (FIG. 2B). The first component part of the first URL (i.e., "www.host.com"), indicating the URL host, is added to a generic root node 302a of the URL tree 300 as host node 302b with the key value of "www.host.com", a generic attribute of HOST, and successor information in the first iteration of previously described step 228 (FIG. 2B). Next, the second component part of the first URL (i.e., "alpha") is added to the URL tree 300 as path node 302c, a child node of host node 302b in the second iteration of previously described step 228 (FIG. 2B). Then, the third component part of the first URL (i.e., "bravo") is added to the URL tree 300 as path node 302d, a child node of path node 302c in the third iteration of previously described step 228 (FIG. 2B). Next, the fourth component part of the first URL (i.e., "golf.php") is added to the URL tree 300 as path node 302e, a child node of path node 302d in the fourth iteration of previously described step 228 (FIG. 2B). Finally, the fifth component part of the first URL (i.e., "query") is added to the URL tree 300 as leaf node 302f, a child node of path node 302e in the fifth iteration of previously described step 228 (FIG. 2B).

Once the first URL's component parts have been added to the URL tree 300, the second URL's component parts may be added to the URL tree 300 using five iterations of previously described step 228 (FIG. 2B). Since the first component part of the second URL is already present in the URL tree 300 as host node 302b, that component part is not added. However, a counter value associated with node 302b may be incremented to indicate that component part "www.host.com" was found in one other URL within the received email. Next, the second component part of the second URL (i.e., "charlie") is added to the URL tree 300 as path node 302g, a child node of host node 302b. Then, the third component part of the second URL (i.e., "foxtrot") is added to the URL tree 300 as path node 302h, a child node of path node 302g. The fourth component part of the second URL (i.e., "tango") is also added to the URL tree 300 as path node 302i, a child node of path node 302h. Finally, the fifth component part of the second URL (i.e., "delta.jpg") is added to the URL tree 300 as leaf node 302j, a child node of path node 302i.

Once the second URL's component parts have been added to the URL tree 300, the third, and final, URL's component parts may be added to the URL tree 300 using four iterations of previously described step 228 (FIG. 2B). Since the first component part of the third URL is already present in the URL tree 300 as host node 302b, that component part is not added. However, a counter value associated with node 302b may be incremented by one (i.e., to 3) to indicate that component part "www.host.com" was found in one other URL within the received email. The second component part of the third URL is also present in the URL tree 300 already as path node 302c, so that component part is also not added. A counter value associated with node 302c may be incremented by one to indicate that component part "alpha" was found in one other URL within the received email. Next, the third component part of the third URL (i.e., "romeo.html") is added to the URL tree 300 as path node 302k, a child node of path node 302c. Finally, the fourth component part of the third URL (i.e., "fragment") is added to the URL tree 300 as leaf node 302l, a child node of path node 302k.

Figure 3B:
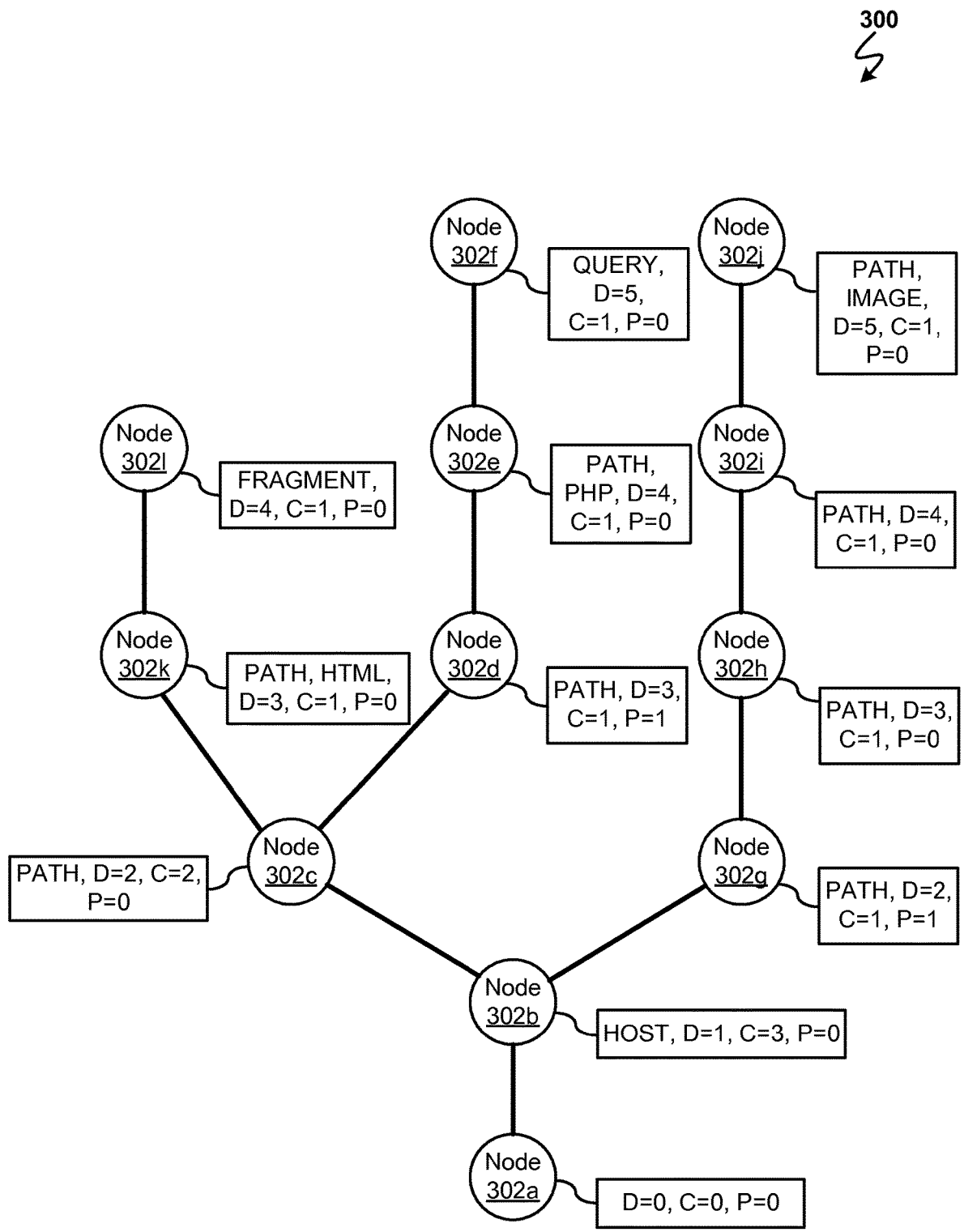
FIG. 3B illustrates an example URL tree structure and node properties according to at least one embodiment.

Referring now to FIG. 3B, an illustration of an example URL tree 300 showing the node properties for each tree node 302a-l according to at least one embodiment is depicted.

According to at least one embodiment, after the URL tree 300 is generated as described above with respect to FIG. 3A, each node 302a-l may then have node properties (e.g., depth value and position value) determined for the node 302a-l based on each node's 302a-l location within the URL tree 300 in addition to the generic attribute already assigned to each node 302a-l as previously described in step 226 (FIG. 2B) and the count value that was determined in previously described step 228 (FIG. 2B).

A node's 302a-l depth value may represent the number of tree edges between the root node and the current node. For example, if the current node is node 302c, there are two tree edges between node 302c and the root node 302a. Thus, node 302c has a depth value of 2 (i.e., D=2). A node's 302a-l position value indicates the relation (e.g., right or left) of the current node to the current node's sibling nodes (i.e., other nodes with the same parent node as the current node). For example, if the current node is node 302c, the current node's parent node (i.e., node 302b) has one other child node (i.e., node 302g), thus node 302g is a sibling node to the current node (i.e., node 302c). Since there are two sibling nodes and node 302c is to the left of node 302g, node 302c would have a position value of 0 (i.e., P=0), and node 302g would have a position value of 1 (i.e., P=1) since node 302g is positioned to the right of node 302c in the URL tree 300.

Each node's 302a-l properties may be stored in a data repository, such as a database 114 (FIG. 1) for use in generating the input string as previously described in step 204 (FIG. 2A). According to at least one embodiment, node properties may be stored as character strings having the order of: generic attributes, depth value, count value, and position value (e.g., node 302b node properties may be stored as "HOST, D=1, C=3, P=0"). The node properties corresponding to each node 302a-l in the URL tree 300 is shown in FIG. 3B.

The order in which nodes are inserted into the URL tree 300 may influence the final configuration of the URL tree 300. Therefore consideration may be given to order the URL tree 300 in a way that may thwart a UBE sender's attempts to circumvent detection. Node successor information may be used to determine the sort order (i.e., the order the nodes are inserted into the URL tree 300). The first sort criteria used to determine a sort order may be the number of successors (i.e., child nodes) the node (e.g., 302c) has. If the number of successors is the same, the second sort criteria used may be the attributes of the successor nodes (e.g., 302d and 302k). For example, node 302c (i.e., "alpha") has two child nodes to be inserted (i.e., node 302d "bravo" and node 302k "romeo.html"). Node 302k has one successor node (i.e., 302l), whereas node 302d has two successor nodes (i.e., 302e and 302f). Since node 302k has fewer successor nodes than node 302d, node 302k is inserted to the left of node 302d.

As described previously, URLs that are known to be valid may be present in a whitelist. Valid URLs may appear in UBEs intentionally or through random text in order to confuse UBE filters. According to at least one embodiment, any URLs identified in an email that are listed in a whitelist may be ignored when building the URL tree 300.

In some instances, an email may contain URLs from different hosts. According to at least one embodiment, a single URL tree 300 may be generated for each host. Thus, if an email has URLs from multiple hosts (e.g., three different hosts), then multiple tree structures 300 may be generated (e.g., three tree structures 300), one for each host found in the email.

According to at least one other embodiment, a single URL tree 300 may be generated to include all of the different hosts found in the email. For example, each host may be added as an additional child node to the generic root node 302a.

Once the URL tree 300 has been built with node properties recorded as depicted in FIG. 3B, an input string may be generated as described previously in step 204 (FIG. 2A). As described previously, the URL tree 300 may be traversed using a known algorithm (e.g., DFS), and the node properties of each node 302a-l may be concatenated in the order the node 302a-l is reached when applying the known tree traversal algorithm (e.g., DFS) to form the input string.

Using the URL tree 300 depicted in FIG. 3B, and applying a DFS tree traversal algorithm, the nodes 302a-l will be visited in the following order: 302a, 302b, 302c, 302k, 302l, 302d, 302e, 302f, 302g, 302h, 302i, and 302j. The resulting input string would be:

{D0, C0, P0} {HOST, D1, C3, P0} {PATH, D2, C2, P0} {PATH, HTML, D3, C1, P0} {FRAGMENT, D4, C1, P0} {PATH, D3, C1, P1} {PATH, PHP, D4, C1, P0}

{QUERY, D5, C1, P0} {PATH, D2, C1, P1} {PATH, D3, C1, P0} {PATH, D4, C1, P0} {PATH, IMAGE, D5, C1, P0}

According to at least one embodiment, once the node properties for all nodes 302a-1 have been appended to the input string, the input string may be hashed using a standard hashing algorithm (e.g., MD5 hashing) to calculate a compact hash (e.g., 16 bytes). The calculated hash may then be used to determine if the email is a UBE or a valid email based on steps 206 (FIG. 2A) and 212 (FIG. 2A) described above.

According to at least one other embodiment, the URLs may be normalized before the URL tree hash value is calculated. Normalization decisions may be made to, for example, remove a query part that includes a single "?" character or a fragment that includes a single "#" character. Canonicalization of URLs may also take place to add relative path names (e.g., www.host.com/a/../../b.html) to the URL tree 300 in a simpler form (e.g., www.host.com/b.html).

It may be appreciated that FIGS. 2A, 2B, 3A, and 3B provide only an illustration of one embodiment and does not imply any limitations with regard to how different embodiments may be implemented. Many modifications to the depicted embodiment(s) may be made based on design and implementation requirements.

Figure 4:
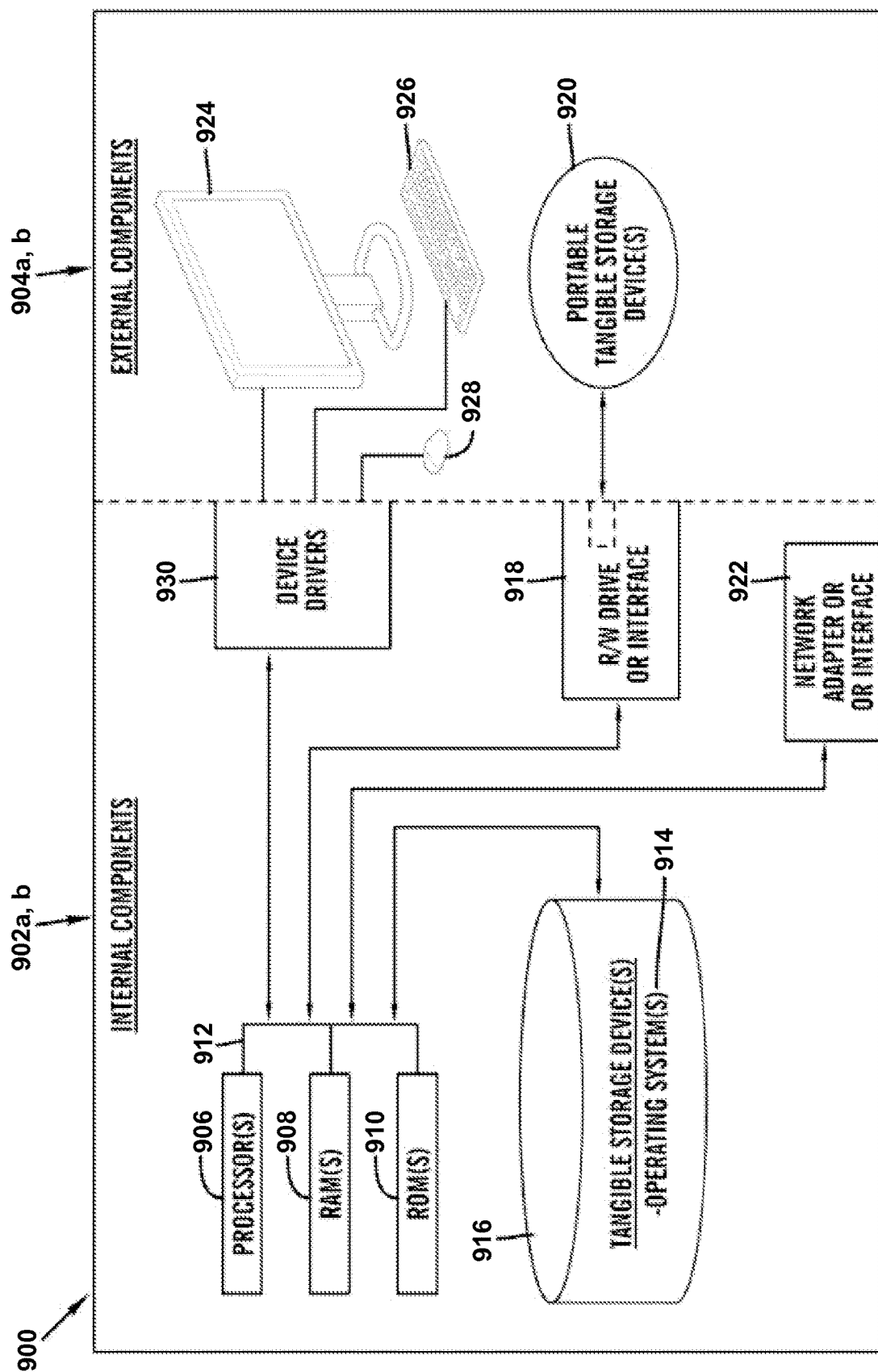
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the UBE detection program 110a (FIG. 1) in client computer 102 (FIG. 1) and the UBE detection program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the UBE detection program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the UBE detection program 110a (FIG. 1) in client computer 102 (FIG. 1) and the UBE detection program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the UBE detection program 110a (FIG. 1) in client computer 102 (FIG. 1) and the UBE detection program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
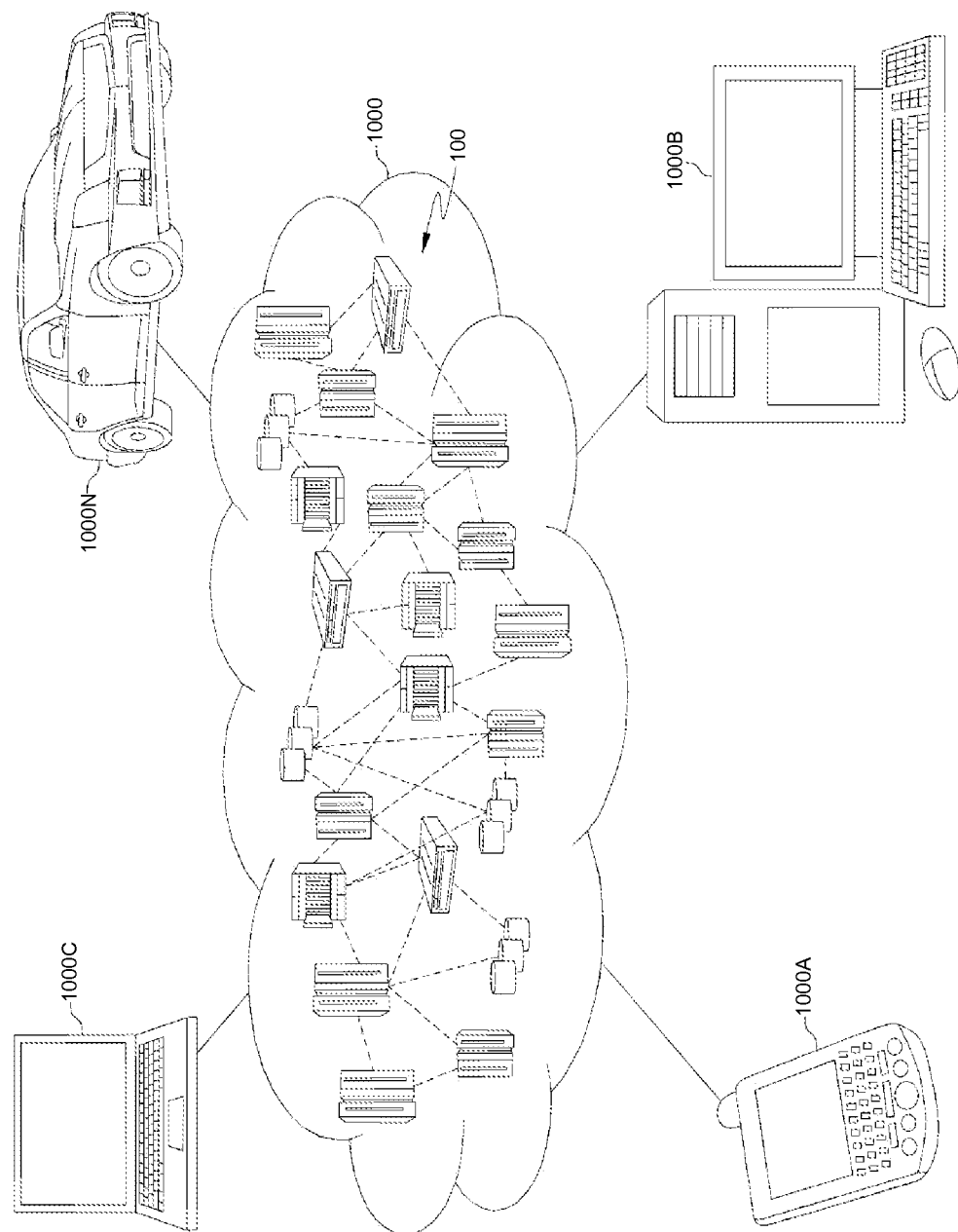
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
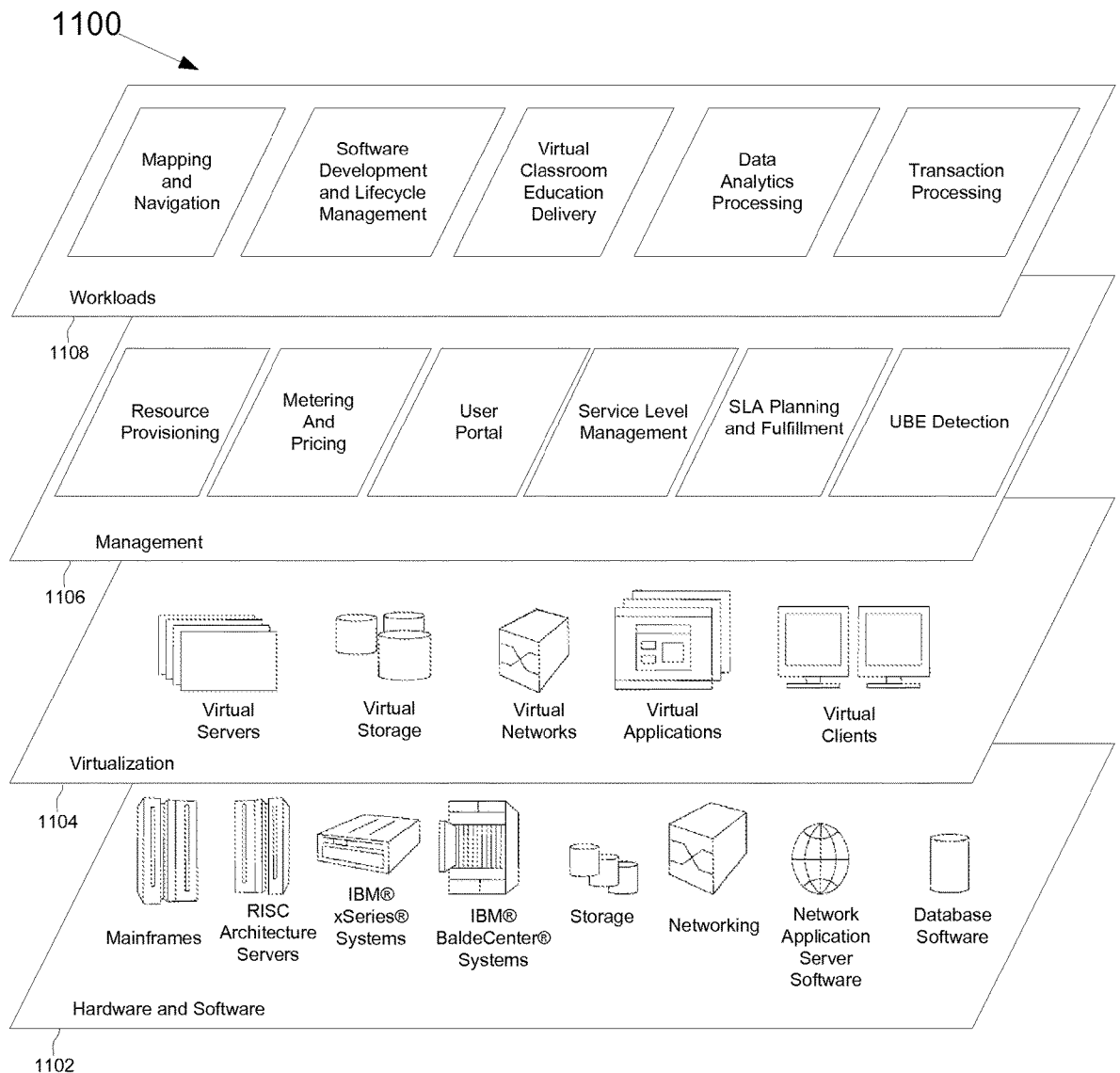
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA. UBE detection provides an efficient way for determining if incoming email is a UBE.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting unsolicited bulk emails (UBE), the method comprising:
   receiving an email having a plurality of uniform resource locators (URLs);
   identifying a uniform resource locator (URL) within the plurality of URLs contained in the received email, wherein the identified URL is not included in a whitelist of valid URLs;
   dividing the identified URL into a plurality of component parts;
   generating a tree structure having a plurality of nodes based on the plurality of component parts;
   determining a plurality of node attributes associated with the plurality of nodes, wherein the determined plurality of node attributes includes a generic attribute that indicates a component type associated with each component within the plurality of components, and wherein the determined plurality of node attributes includes a counter value indicating a number of times a component part appeared in the plurality of URLs contained in the received email;
   assigning the determined plurality of node attributes to the plurality of nodes;
   generating an input string based on the generated tree structure, wherein the generated input string comprises a plurality of characters representing the assigned plurality of node attributes;
   calculating a hash value based on the generated input string;
   determining if the calculated hash value matches a UBE hash value within a plurality of UBE hash values;
   responsive to determining that the calculated hash value matches the UBE hash value, determining if a first counter indicating a number of emails containing the UBE hash value within the plurality of UBE hash values has exceeded a predetermined first threshold value;
   responsive to determining that the first counter has exceeded the predetermined first threshold value, determining if the calculated hash value matches a valid email hash value within a valid email hash database;
   responsive to determining that the calculated hash value matches the valid email hash value, determining if a second counter indicating a number of valid emails containing the calculated hash has exceeded a predetermined second threshold value; and
   responsive to determining that the second counter has not exceeded the predetermined second threshold value, identifying the received email as a UBE based on determining that the calculated hash value matches the UBE hash value.

2. The method of claim 1, wherein the plurality of component parts of the identified URL comprises at least one of a host, a path, a query, and a fragment.

3. The method of claim 1, wherein generating the tree structure based on the plurality of component parts comprises adding a plurality of nodes to the tree structure based on the plurality of component parts, wherein each node within the plurality of nodes has a plurality of attributes.

4. The method of claim 3, wherein the plurality of attributes associated with each node within the plurality of nodes comprises at least one of a depth value and a position value.

5. The method of claim 3, wherein adding a plurality of nodes to the tree structure comprises adding the plurality of nodes based on the order of the plurality of component parts in the identified URL.

6. The method of claim 4, wherein generating the input string comprises concatenating a plurality of string characters representing the plurality of attributes associated with each node within the plurality of nodes, and wherein the order of the concatenating is based on traversing the tree structure using a depth-first search algorithm.

* * * * *